United States Patent [19]

Bour et al.

[11] Patent Number: 4,463,166
[45] Date of Patent: Jul. 31, 1984

[54] PROCESS FOR MAKING POLYTETRAMETHYLENE ADIPAMIDE

[75] Inventors: Edmond H. J. P. Bour, Limbricht; Jean M. M. Warnier, Urmond, both of Netherlands

[73] Assignee: Stamicarbon B.V., Geleen, Netherlands

[21] Appl. No.: 433,879

[22] Filed: Oct. 13, 1982

[30] Foreign Application Priority Data

Oct. 13, 1981 [NL] Netherlands .......................... 8104639

[51] Int. Cl.³ ............................................. C08G 69/28
[52] U.S. Cl. ..................................................... 528/336
[58] Field of Search .......................................... 528/336

[56] References Cited

U.S. PATENT DOCUMENTS 2,163,636  6/1939  Spanagel ............................ 528/336
3,932,364  1/1976  Yamazaki et al. ................. 528/336

OTHER PUBLICATIONS

Synthetic Fibre Developments in Germany, Part II, Schlack et al., Jul. 1945.
Gaymans et al., "Preparation of Some Properties of Nylon 46", 15 J. Polymer Science, pp. 537, 545, (1977).

Primary Examiner—Harold D. Anderson
Attorney, Agent, or Firm—Cushman, Darby & Cushman

[57] ABSTRACT

A process for preparing a white nylon-4,6 polyamide in an non-aqueous inert polar solvent at atmospheric or only slightly above atmospheric pressure at a temperature of about 150° C. to about 300° C. Higher molecular weight polyamides may be obtained following after-condensation.

10 Claims, No Drawings

PROCESS FOR MAKING POLYTETRAMETHYLENE ADIPAMIDE

BACKGROUND OF THE INVENTION

The present invention relates to a process for preparing polytetramethylene adipamide (nylon-4,6) by making a polymer based on adipic acid and 1,4-diaminobutane which polymer may be converted by further condensation, if desired or necessary, into a high-molecular weight polyamide.

A prepolymer can be made in a liquid phase by heating the salt of adipic acid and 1,4-diaminobutane at an elevated pressure until a prepolymer is formed and then a higher molecular weight polyamide can be obtained by allowing the prepolymer to condense further in solid form. Disadvantageously in such process the reactions necessarily take place in an autoclave. Such process employs high pressures and temperatures. As a consequence of such processing conditions, a substantial capital investment in plant and equipment.

It is also known in the art to react diaminobutane and adipic acid chloride in a boundary surface polymerization process. Such processes are described in, for instance, 50 J. Polymer Sci. 87 (1961) and Bull. Soc. Chem. 553 (France 1970). A chief drawback to such a process is the formation of hydrochloric acid.

An object of the present invention is to make a polytetramethylene adipamide polymer is a simple manner without the abovedescribed drawbacks. This and other objects of the present invention will become readily apparent from the following description of the invention.

DESCRIPTION OF THE INVENTION

The present invention resides in a method for making polytetramethylene adipamide, a polyamide substantially consisting of units of

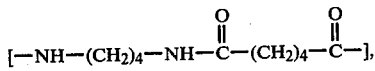

by heating adipic acid and 1,4-diaminobutane and, if dsired, up to 25 weight percent other polyamide-forming compounds in the liquid phase until a polymer or prepolymer is obtained. In this process the polyamide-forming compounds are heated in 2-pyrrolidone or N-methyl-2-pyrrolidone as a non-aqueous inert polar solvent at a temperature of between about 150° C. and about 300° C. at about atmospheric pressure.

Advantageously this process can be performed in a simple manner. For instance, atmospheric or only slightly elevated pressure may be employed. Consequently, high pressure autoclave equipment is not required thereby resulting in reduced capital expenditures and hence reduced operating costs.

Moreover, if the process is used for making a prepolymer, it will be found that the prepolymer is well suited for after-condensation to a high-molecular weight white polytetramethylene adipamide.

The use of 2-pyrrolidone or N-methyl-2-pyrrolidone as solvent, makes it possible to precipitate the prepolymer or polymer from the polymer reaction solution by cooling and to recover the prepolymer or polymer from the reaction solution by filtration or centrifugation. This prepolymer or polymer recovery is related to the very low solubility of such products in such solvents at temperatures below 50° C. Thus, the concentration of the polyamide-forming compounds in the solvent depends in part on the solubility of the prepolymer or polymer to be formed from such polyamide-forming compounds. Generally between about 10 to about 300 parts by weight of polyamide-forming compounds are used per about 100 parts by weight of solvent. Preferably between about 30 to about 150 parts by weight of polyamide-forming compounds are used per 100 parts of solvent.

According to the present invention, 1,4-diaminobutane and adipic acid can be employed as starting material. Consequently, the customary salt formation step in the preparation of polyamides can be avoided. However, if so desired, the salt forms of the aforementioned compounds may also be employed as starting materials. Therefore, it should be understood that the present process contemplates the use of the compounds per se or the salt forms thereof separately or together in combination. The molar ratio between 1,4-diaminobutane and adipic acid is 1:1 or higher. The molar ratios may be adjusted or otherwise varied to account for the loss of either component during the process.

In addition to the 1,4-diaminobutane and the adipic acid, other polyamide-forming compounds can be worked up in the polymer. Such compounds are used in at most subordinate quantities of less than 25% by weight calculated in respect of the 1,4-diaminobutane and adipic acid. For instance such polyamidizable compounds include aliphatic, cycloaliphatic or aromatic dicarboxylic acids and/or diamines or copolymerizable lactams. Exemplary diacid compounds include, among others, succinic acid, sebacic acid, isophthalic acid and terephthalic acid. Exemplary diamines include among others, hexamethylene diamine, and diaminomethyl benzene. Suitable copolymerizable and polyamidizable lactams include, for instance, caprolactam, laurolactam, and other lactams. include, for instance, caprolactam, laurolactam, and other lactams. Amino carboxylic acids, such as ε-aminocaproic acid and 11-aminoundecanoic acid may also be used. Preference, however, is given to preparing a homopolyamide which has very useful physical properties.

Optionally, in the polymerization or prepolymerization process a catalyst may be present, such as, for instance, phosphoric acid or another inorganic acid.

Agents regulating the molecular weight of the polymer or prepolymer may also be present such as, for instance, acetic acid or benzoic acid.

The process according to the present invention can be used to prepare a prepolymer, i.e., a polymer having a relatively low molecular weight, corresponding with a relative viscosity ($\eta_{rel}$ measured at 20° C. of a solution of 1.0 g polymer in 100 ml of 96% sulphuric acid) of between about 1.05 and about 2.25. In most cases the relative viscosity of such low molecular weight prepolymer lies between about 1.10 and about 2.00. To achieve this objective, a relatively low temperature and/or relatively low residence time of the reactants is applied, i.e. reaction temperatures between 150° C. and 250° C., preferably between 175° C. and 225° C., with residence times ranging from 1.5 to 8 hours.

The advantage of the above-described prepolymer process is that the prepolymer can be prepared at atmospheric pressure. The prepolymer thus obtained can be separated off and be converted, by further condensation, i.e., after-condensation, in the solid phase, preferably in a water vapor-containing atmosphere and at a temperature of between 250° C. and the melting point of the polymer, into a high-molecular weight polyamide, i.e., a product having a relative viscosity of between about 2.5 and about 7.5.

The after-condensation is then effected in the solid phase, and hence at a temperature below at least the substantial softening point of the polyamide. To diminish the duration of the after-condensation, a temperature of at least about 200° C. is desirable. This after-condensation is preferably effected in the solid phase at a temperature between 220° C. and 270° C. and more specifically between 225° C. and 275° C., under an atmosphere of water vapor. Very suitable are temperatures of between about 225° C. and 275° C.

To obtain a homogeneous product, it is further desirable to keep the polyamide particles moving under agitation during the after-condensation. To achieve this, such after-condensation reaction can be effected in such equipment (already known in and of itself) as a rotation drum, in a stationary reactor provided with stirrers, or in an expanded or fluidized bed.

The duration of the after-condensation reaction depends on the ultimately desired molecular weight, the temperature, the molecular weight of the prepolymer and to some extent on the pressure employed. Preferably, such conditions are so chosen that the (number-average) molecular weight $M_n$ of the final polyamide product will be between about 15,000 and about 75,000 and more specifically between about 20,000 and about 50,000. At about 250° C., the duration of this reaction is in most cases between 2 and 12 hours. A longer time is possible as well. In order to reduce the reaction time or to reach a higher molecular weight in a certain length of time, a prepolymer containing one of the known acid catalysts for aiding amidepolycondensation reactions may be employed. Such acid catalyst may have been added before, during or after the formation of the prepolymer. Very suitable are strong inorganic acids of little or no volatility, specifically phosphoric acid.

The prepolymer may also contain usual non-interfering additives, such as pigments or matting agents, insofar as they do not disturb the after-condensation reaction.

By applying a higher temperature and/or longer residence time a high-molecular weight polyamide, having a relative viscosity above 2.25, for instance between 2.5 and 3.5, can also be obtained, i.e. by applying reaction temperatures abouve 225° C. and/or reaction times ranging from 6 to 16 hours.

However, after-condensation in the solid phase is preferably employed in order to obtain a very high molecular weight polymer, corresponding with a relative viscosity higher than 3.5.

A low molecular weight of polyamide may range from a molecular weight of about 1000 to about 10,000 which corresponds to a $\eta_{rel}$ of about 1.1 to about 2.0. A high molecular weight polyamide may range from a molecular weight of about 15,000 to about 45,000 which corresponds to a $\eta_{rel}$ of about 2.5 to about 7.5.

If the after-condensation involves the loss of diaminobutane, for example, it is recommended that a certain excess of diaminobutane be used. This excess may be, for instance, between about 0.5 mole % and about 15 moles % in respect of the quantity equivalent of the adipic acid. Preferably in such cases, an excess of between about 1.5% and 5 moles % of diaminobutane is employed.

The present process is preferably performed at about atmospheric pressure. If required a higher pressure may be applied, for instance between about 1 and about 5 bar, if such pressure is necessary to keep the solvent in a liquid form, in view of the reaction temperature applied.

It is recommended during the first phase of the polymerization to drain off the liberated water, for example, by keeping the partial water vapor ($P_{H_2O}$) pressure to a minimal. If necessary this may be effected by applying a reduced pressure, i.e., lower than 1 bar, for some time during the first phase, i.e. for about 30 minutes to about 3 hours.

The process is performed at a temperature of between about 150° C. and about 300° C., and preferably between about 175° C. and about 300° C. If only a prepolymer is to be prepared, a temperature of between about 175° C. and about 225° C. is very suitable. For the preparation of a polyamide having a higher molecular weight, preference is given to applying a temperature of between about 225° C. and about 290° C. In the latter case the temperature during the polymerization can also be increased gradually, at about 0.1° C./minute to about 5° C./minute with the appropriate precautions against local overheating.

The polymer product obtained according to the present process can be separated from the reaction solutions or recovered by evaporating off the solvent or by adding such a quantity of a non-solvent that the polymer precipitates. Suitable non-solvents include, for instance, water.

Advantageously, preference is given to cooling the solution to, for instance, a temperature of about 20° C. to about 30° C. so that the polymer precipitates and can be recovered by employing filtration or centrifugation techniques.

The invention will now be elucidated by means of the following examples without being restricted to the embodiments described therein. It is understood that a N-methyl-2-pyrrolidone solvent can be employed instead of the 2-pyrrolidone solvent employed in the Examples.

EXAMPLE I

The polymerization was performed in a reactor provided with a stirrer, heating jacket and reflux condenser. At a temperature of 120° C., 31.7 grams adipic acid was dissolved in 100 grams 2-pyrrolidone. Subsequently, during stirring, 19.1 grams 1,4-diamonobutane was added, at which time a precipitate of the adipic acid salt was formed. During heating to 165° C. this salt dissolved again. The solution was kept at 185° C. under atmospheric pressure for six hours and subsequently coagulated in water at room temperature. The precipitate formed in this process was filtered off, washed with hot water and dried. Thus 37 grams white powdery polytetramethylene adipamide having a relative viscosity of 1.3 (measured at 20° C. of a solution of 1.0 gram polymer in 100 ml 96% sulphuric acid) was obtained.

The aforeproduced polytetramethylene adipamide was after-condensed for 8 hours at 260° C. in an atmosphere of nitrogen and water vapor (volume ratio 3:1). A white polyamide was obtained having a relative viscosity of 5.57.

EXAMPLE II

In a manner further known in the art the salt of 1,4-diaminobutane was prepared with adipic acid. 175 grams of the salt was dissolved, during stirring, in 400 grams 2-pyrrolidone at 180° C. The solution was subsequently heated for 6 hours at 210° C. under atmosferic pressure with some reflux of the solvent. The polyamide was then recovered by cooling the solution to room temperature and polyamide was then worked up in the manner described in Example I. 151 grams of a white powdery polyamide was obtained.

The thus obtained white powdery polyamide had a relative viscosity of 1.55.

While the invention has now been described in what are considered to be the most practical and preferred embodiments, it should be understood that the invention is not to be limited to the disclosed embodiments but on the contrary, is intended to cover various modifications and equivalent processes included within the spirit and scope of the appended claims, which claim scope is to be accorded the broadest interpretation so as to encopass all such modifications and equivalent processes.

What is claimed is:

1. Process for preparing a nylon 4,6 polymer consisting substantially of repeating units of:

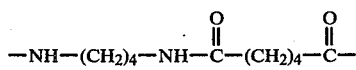

which process consists essentially in:
   (a) heating adipic acid or the salt thereof, 1,4-diaminobutane or the salt thereof and from 0 weight % to 25 weight % of one or more nylon-forming compounds, in a 2-pyrrolidone solvent at a temperature between about 150° C. and about 300° C., at a pressure sufficient to maintain said solvent in a liquid state, to form a reaction solution and to obtain said nylon 4,6 polymer product therein; and
   (b) subsequently recovering said polymer product from said reaction solution.

2. A process according to claim 1, wherein the temperature is between about 225° C. and about 290° C.

3. A process according to claim 1 wherein said polymer product has a relative viscosity of between 1.05 and 2.25, which product is then after-condensed to obtain a polyamide having a relative viscosity of between about 2.5 and about 7.5, said respective relative viscosities being determined from 1.0 g polymer in 100 ml of 96% sulfuric acid at 20° C.

4. A process according to claim 1 or 2 wherein the amount of 1,4 diaminobutane and adipic acid present is between about 30 and 150 parts by weight per 100 parts by weight of said solvent.

5. A process according to claim 1 wherein the amount of adipic acid and 1,4-diaminobutane present is between about 10 to about 300 parts by weight of said solvent.

6. A process according to claim 1 wherein said pressure is between about 1 bar to about 5 bar.

7. A process according to claim 6 wherein said polymer product has a relative viscosity between 1.05 and 2.25, which product is then after-condensed to obtain a polyamide having a relative viscosity of between about 2.5 and 7.5, said respective relative viscosities being determined from 1.0 g polymer in 100 ml 96% sulfuric acid at 20° C.

8. A process according to claim 6 wherein the amount of adipic acid and 1,4-diaminobutane present is between about 30 and about 150 parts by weight of said solvent.

9. A process for preparing a nylon 4,6 polymer consisting substantially of repeating units of:

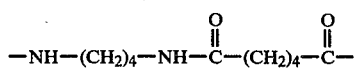

which process consists essentially in:
   (a) heating adipic acid or the salt thereof, 1,4-diaminobutane or the salt thereof and from about 0 weight % to about 25 weight % of one or more nylon-forming compounds, in a 2-pyrrolidone solvent at a temperature between about 175° C. and about 300° C., at a pressure of about 1 bar to about 5 bar to maintain said solvent in a liquid state, to form a reaction solution and to obtain said nylon 4,6 polymer product therein; and
   (b) subsequently recovering said polymer product from said reaction solution.

10. A process according to claim 9 wherein the amount of adipic acid and 1,4-diaminobutane present is between about 10 to about 300 parts by weight of said solvent.

* * * * *